United States Patent
March Nomen (10) Patent No.: US 12,352,243 B1
(45) Date of Patent: Jul. 8, 2025

(54) WIND TURBINE BLADE INTEGRATING A LIGHTNING PROTECTION SYSTEM

(71) Applicant: Siemens Gamesa Renewable Energy Innovation & Technology, S.L., Sarriguren (ES)

(72) Inventor: Victor March Nomen, Sant Cugat del Valles (ES)

(73) Assignee: Siemens Gamesa Renewable Energy Innovation & Technology, S.L., Sarriguren (ES)

( * ) Notice: Subject to any disclaimer, the term of this patent is extended or adjusted under 35 U.S.C. 154(b) by 0 days.

(21) Appl. No.: 18/763,783

(22) Filed: Jul. 3, 2024

(51) Int. Cl.
  F03D 80/30 (2016.01)
  F03D 1/06 (2006.01)

(52) U.S. Cl.
  CPC ......... F03D 80/301 (2023.08); F03D 1/0681 (2023.08); F03D 80/30 (2016.05); F05B 2240/30 (2013.01)

(58) Field of Classification Search
  CPC ....... F03D 80/301; F03D 1/0681; F03D 80/30
  See application file for complete search history.

(56) References Cited

U.S. PATENT DOCUMENTS

| | | | |
|---|---|---|---|
| 11,346,328 B2 | 5/2022 | Brilliant et al. | |
| 11,661,922 B2 * | 5/2023 | Aubrion | F03D 1/0675 416/241 R |
| 11,674,501 B2 * | 6/2023 | Ponnada | F03D 17/00 416/1 |
| 12,012,938 B2 * | 6/2024 | Thwaites | F03D 80/30 |
| 2012/0043979 A1 * | 2/2012 | Jakobsen | G01R 31/54 324/691 |
| 2015/0292479 A1 | 10/2015 | Ohlerich et al. | |
| 2020/0200151 A1 * | 6/2020 | Brilliant | F03D 80/30 |
| 2021/0404443 A1 * | 12/2021 | Thwaites | F03D 1/0675 |

(Continued)

FOREIGN PATENT DOCUMENTS

| | | | |
|---|---|---|---|
| EP | 2930010 A1 | 10/2015 | |
| EP | 3091228 A1 * | 11/2016 | F03D 1/0675 |

(Continued)

OTHER PUBLICATIONS

European Search Report of European Application No. 23168171.9 (Year: 2023).*

*Primary Examiner* — Brian Christopher Delrue
(74) *Attorney, Agent, or Firm* — Schmeiser, Olsen & Watts, LLP (57) ABSTRACT

A wind turbine blade integrating a lightning protection system is provided. The wind turbine blade includes one spar cap formed by carbon plates stacked together; and a first down-conductor placed alongside the tip region of the spar cap, and a second down-conductor placed alongside the root region of the spar cap. The first down-conductor extends from the spar cap's tip end to the mid region, and terminates at a first down-conductor's end adjacent a first region of the spar cap which extends from a cross-sectional area of the spar cap which area is equal or higher than 75% of the maximum cross-sectional area of the spar cap, which is closest to the spar cap's tip end, to a cross-sectional area of the spar cap which is 100% of the cross-sectional area of the spar cap, being 100% of the cross-sectional area the one closest to the spar cap's root end.

12 Claims, 9 Drawing Sheets

(56) References Cited

U.S. PATENT DOCUMENTS

| | | | |
|---|---|---|---|
| 2022/0003215 A1* | 1/2022 | Thwaites | B29C 70/30 |
| 2023/0041394 A1* | 2/2023 | Eiriksson | B29C 70/52 |
| 2023/0272779 A1* | 8/2023 | Brilliant | H02G 13/80 |
| | | | 416/230 |
| 2023/0349364 A1* | 11/2023 | Nauheimer | F03D 1/0679 |
| 2024/0410340 A1* | 12/2024 | Brilliant | F03D 80/301 |

FOREIGN PATENT DOCUMENTS

| | | | | |
|---|---|---|---|---|
| EP | 3943745 A1 | 1/2022 | | |
| EP | 3997331 A1 | 5/2022 | | |
| WO | WO-2011077970 A1 * | 6/2011 | | F03D 80/30 |
| WO | WO-2020103991 A1 * | 5/2020 | | B29C 70/30 |
| WO | WO-2021228606 A1 * | 11/2021 | | F03D 1/0675 |

* cited by examiner

WIND TURBINE BLADE INTEGRATING A LIGHTNING PROTECTION SYSTEM

FIELD OF TECHNOLOGY

The following relates to wind turbine blades integrating a lightning protection system.

BACKGROUND

Figure 1A:
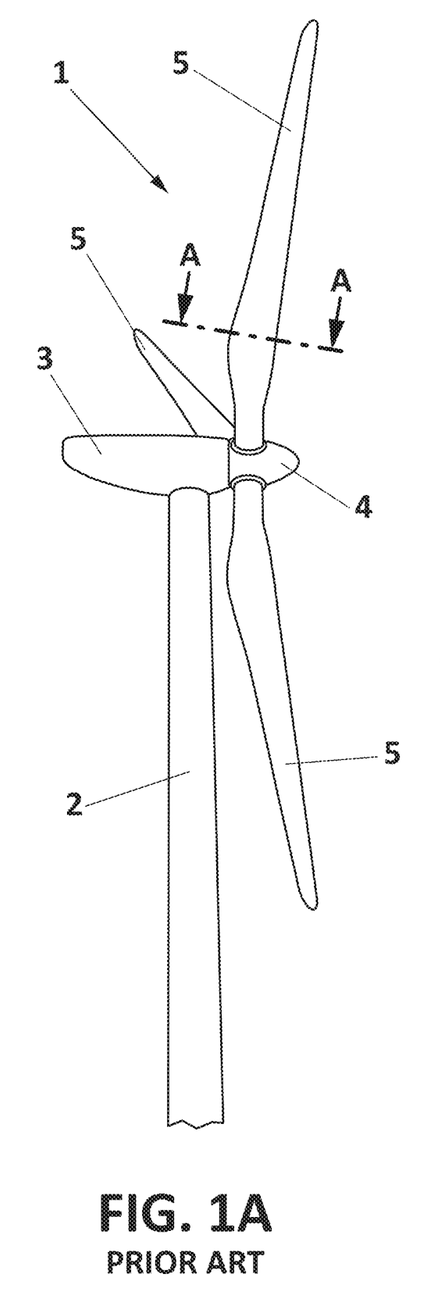
FIG. 1A shows a perspective view of a conventional wind turbine of the conventional art.
Figure 1B:
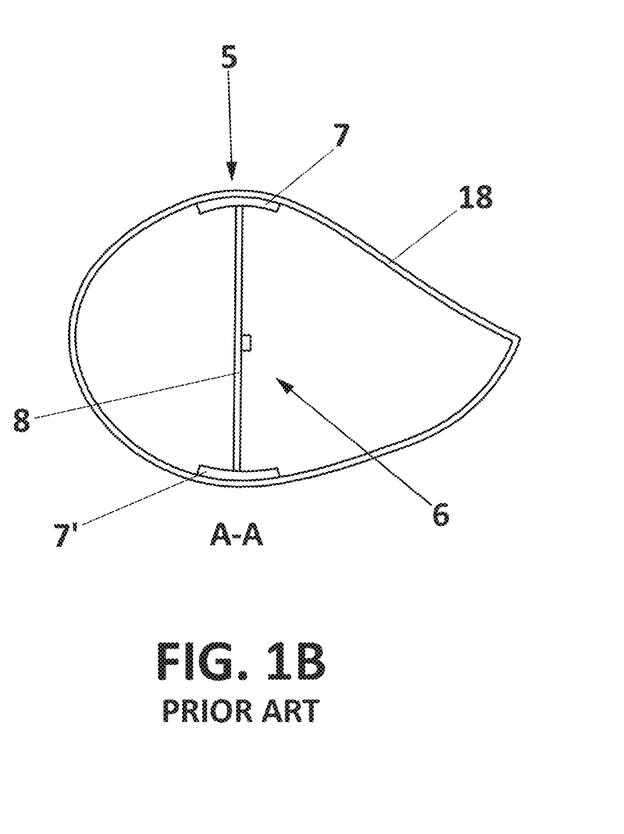
FIG. 1B shows a cross-sectional view of one of the blades.

As represented in FIG. 1A, typically a wind turbine (1) includes a tower (2), a nacelle (3) supported by the tower (2), a hub (4) installed at the nacelle (3), and several blades (5) attached to the hub (4). In turn, as shown in FIG. 1B, each blade (5) is formed by an outer shell (18) and at least one beam (6) formed by a web (8) and two spar caps (7,7') joined to the web's edges, such that the beam (6) is attached internally to the shell (18) by the two spar caps (7,7').

Lightning is likely to strike wind turbines blades due to their exposed location and height. As lightning strikes may cause considerable damage to a wind turbine, wind turbines incorporate lightning protection systems designed to prevent lightning from damaging the wind turbine blades, bearings and electrical systems of the wind turbine.

Conventionally, lightning protection systems for wind turbine blades include metallic down conductors attached to a beam of the wind turbine blade and extending longitudinally from the blade's tip to its root at which the wind turbine blade is attached to a hub. By additional down-conductors running from the hub via the nacelle and through the tower, lightning currents are conducted to ground.

There are several types of electrical circuits to protect wind turbine blade carbon beams against lightning strikes. For example, the European patent application EP-3943745 A1 describes a carbon pultruded blade carbon beam comprising a stack of carbon pultruded layers having at least a bottom layer and a top layer, each layer having a first end and a second end. The stack defining a tip-region, a root-region, and a mid-region; at least one lightning conductor extending along the stack from the tip-region to the root-region; and a plurality of electrical connections connecting the stack of layers with the lightning conductor, each end of each layer is electrically connected with the lightning conductor by one of the electrical connections; and each electrical connection that connects one of the ends of the top layer with the lightning conductor is electrically connected with the bottom layer.

Figure 2:
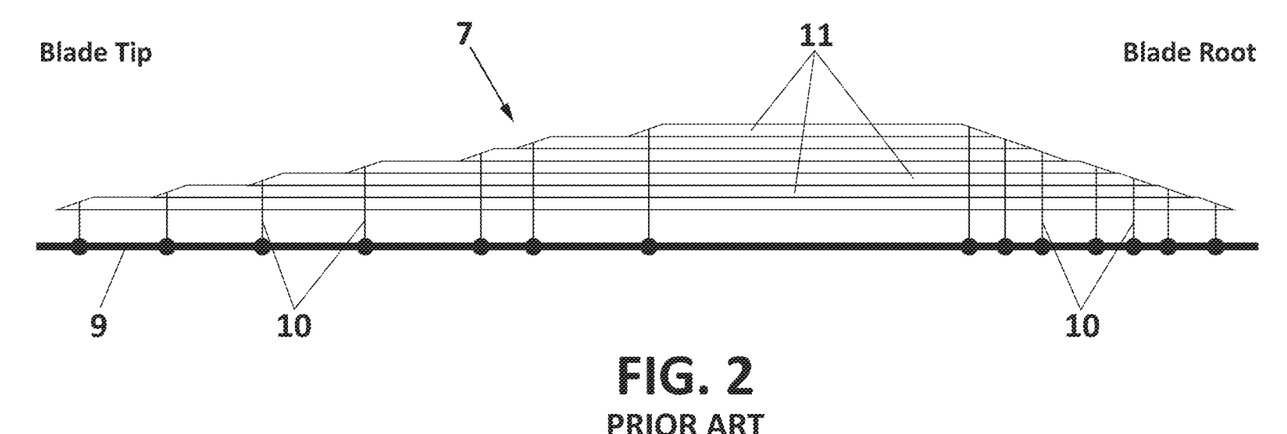
FIG. 2 shows a schematic representation of a longitudinal cross-sectional view of a spar cap of a wind turbine blade according to the conventional art.

The general concept of the electrical circuit described in the European patent application EP-3943745 A1 is represented in FIG. 2. A carbon spar cap (7) is formed by a plurality of stacked carbon planks or plates (11) having tapered ends, and a down-conductor (9) consisting of a cable running along the spar cap (7) from the root end to the tip end. Electrical connections (10) are provided connecting all the chamfer ends of the carbon planks or plates (11) to the down-conductor (9).

Another type of circuit is described in the PCT patent publication WO 2021//228606 A1. The general concept of the electrical circuit described in the PCT patent application WO 2021//228606 A1, is represented in FIG. 3, wherein a lightning strike circuit has two separated down-conductors, a first down-conductor (12) for the tip region of the blade and a second down-conductor (13) for the root region of the blade, so that there is no down-conductor cable running along a large mid region of the carbon spar caps (7), thereby using less material and reducing manufacturing complexity.

Figure 3:
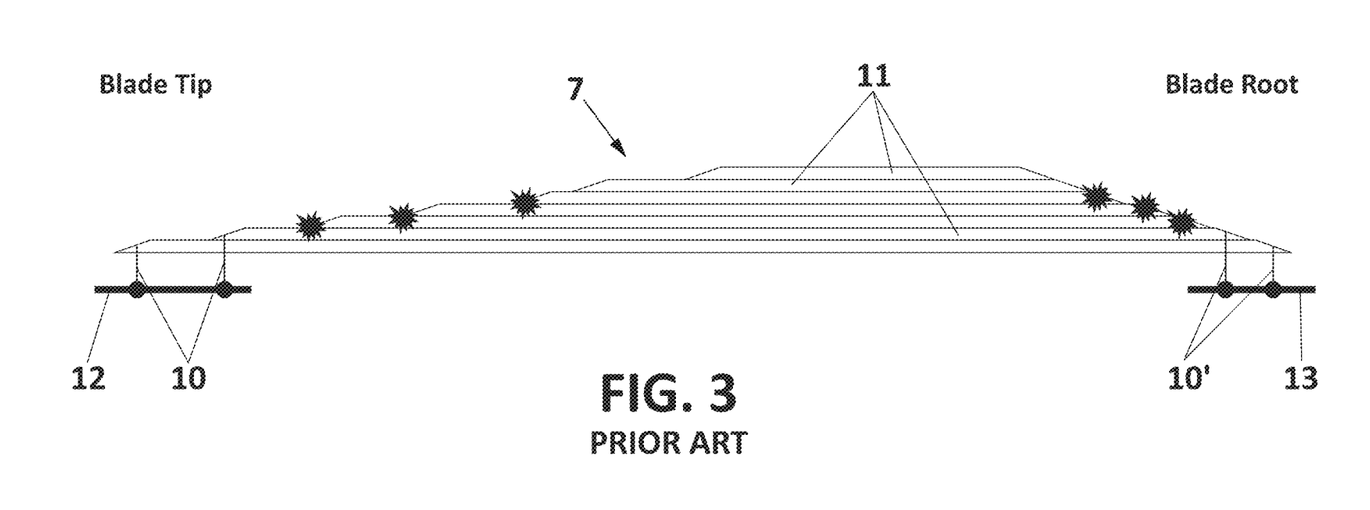
FIG. 3 shows a schematic representation of a longitudinal cross-sectional view of a spar cap of a wind turbine blade according to the conventional art.

In most of the cases, as shown in FIG. 3, the slope of tip region is larger than the slope of the root region, so any electrical connection (10) at tip needs to have a length of about 10-20 meters to reach the 50% of the maximum carbon spar cap cross-section. However, If the electrical connection is just few meters, where the cross-section of the spar cap is below the 50% of the maximum cross-section at the mid-span region of the spar cap, then there is a risk of electric sparks in the rest of the carbon planks at the locations marked in FIG. 3, because lightning current would circulate from a carbon plank to adjacent carbons planks through the ends thereof, that might cause delamination of the planks due to electric arcing.

SUMMARY

An aspect relates to a wind turbine blade integrating a lightning protection system, which reduces manufacturing cost and complexity.

Embodiments of the invention are based on the fact that down-conductors for conducting lightning current, are only needed to some extent at root and tip regions of a carbon spar cap for the conduction of current through those regions, but a down-conductor is not required at a mid-span region of the spar cap, because lightning current can circulate through the carbon spar cap mid-region without down-conductor at that region, that is, the carbon plates at a mid-region can act as down-conductor.

Therefore, elimination of down-conductor at a large mid-region of the carbon spar caps, or in other words reduction of the length of the down-conductors and reduction of the number of electric connections with the carbon plates, reduces manufacturing complexity and reduce production cost of the wind turbine blade, in turn reducing cost of a wind turbine.

More specifically, an aspect of embodiments of the invention refers to a wind turbine blade integrating a lightning protection system, wherein the wind turbine blade has at least one internal carbon beam to reinforce the blade. Conventionally, the carbon beam is composed by a web and two spar caps which are formed by a plurality of electrically conductive carbon plates or laminates stacked together, such that the stack of carbon plates has a bottom plate, a top plate, and a plurality of intermediate plates stacked in between the bottom and top plates.

Each spar cap is an elongated body extending along an axis (X) and extending between a spar cap's root end and spar cap's tip end, so that the spar cap has a blade tip region, a blade root region and a blade mid region in between the blade tip and root regions.

Each carbon plate has a root end, which is the end closer to the spar cap's root end, and a tip end which is the end closer to the spar cap's tip end. Typically, the carbon plates ends are tapered ends, that is, they have the shape of a chamfer.

According to embodiments of the invention, the wind turbine blade spar cap further comprises a first down-conductor placed alongside the tip region, and a plurality of electric conductors connecting the first down-conductor to some of the tip ends of the carbon plates, and a second down-conductor placed alongside the root region, and a plurality of electric conductors connecting the second down-conductor to some of the root ends of the carbon plates.

In an embodiment, the first down-conductor extends from the spar cap's tip end towards the beam's mid region, and terminates at an end of the first down-conductor located adjacent a first region of the spar cap which extends from a cross-sectional area of the spar cap which area is equal or higher than 75% of the maximum cross-sectional area of the spar cap, being that area the one closest to the spar cap's tip end, to a cross-sectional area of the spar cap which area is 100% of the cross-sectional area of the spar cap, being that 100% of the cross-sectional area the one closest to the spar cap's root end.

In an embodiment, the second down-conductor extends from the spar cap's root end towards the spar cap's mid region, and terminates at an end of the second down-conductor located adjacent a second region of the spar cap which extends from a cross-sectional area of the spar cap which area is equal or higher than 75% of the maximum cross-sectional area of the spar cap, being that area the one closest to the spar cap's root end, to a cross-sectional area of the spar cap which area is 100% of the cross-sectional area of the spar cap, being that 100% of the cross-sectional area the one closest to the spar cap's tip end.

Embodiments of the invention rely on the fact that, even if carbon fibers of the carbon plates are worst conductors of electrical currents than copper conductors, due to the large cross-sectional area of the beam at a mid-span region thereof, the impedance of that mid region is lower than the one for the down conductor, so that lightning current would flow through the mid region of the spar cap, thus, a down-conductor is not required at that mid-region, which implies that the length of the first and second down-conductors can be reduced.

Additionally, in some practical implementations depending on the number of carbon plates forming each spar cap, the number of electric connections connecting the down-conductor to the carbon plates ends can also be reduced. Therefore, in an embodiment of the invention, at least the top carbon plate of the stack of plates, is not electrically connected by an electric conductor to the first or to the second down conductors, so that a lightning strike current would flow from the first down-conductor to an intermediate carbon plate, and from that intermediate carbon plate to the top carbon plate, and from the top carbon plate to the second down conductor via an intermediate carbon plate.

In an alternative embodiment of the invention, the first down-conductor extends from the spar cap's tip end to a plane orthogonal to the spar cap which passes through the end of the top carbon plate which is closest to the spar cap's tip end. All the carbon plates have their tip end connected to the first down-conductor. The second down-conductor extends from the spar cap's root end to a plane orthogonal to the spar cap which passes through the end of the top carbon plate which is closest to the spar cap's root end. All the carbon plates have their root end connected to the first down conductor.

In an embodiment, the first and the second down-conductors are generally straight conductors running parallel to the axis (X) along which the spar cap extends.

In an embodiment of the invention, the wind turbine blade comprises two spar caps, each spar cap constructed as defined in any of the embodiments described above. The wind turbine blade has a lightning receptor at the tip of the beam having two spar caps, and a root terminal at the root end. The two down-conductors of the tip region of the two spar caps are connected at one end to the lightning receptor, and the two down-conductors of the root region of the two spar caps are connected at one end to the root terminal.

BRIEF DESCRIPTION

Some of the embodiments will be described in detail, with references to the following Figures, wherein like designations denote like members.

DETAILED DESCRIPTION

Figure 4:
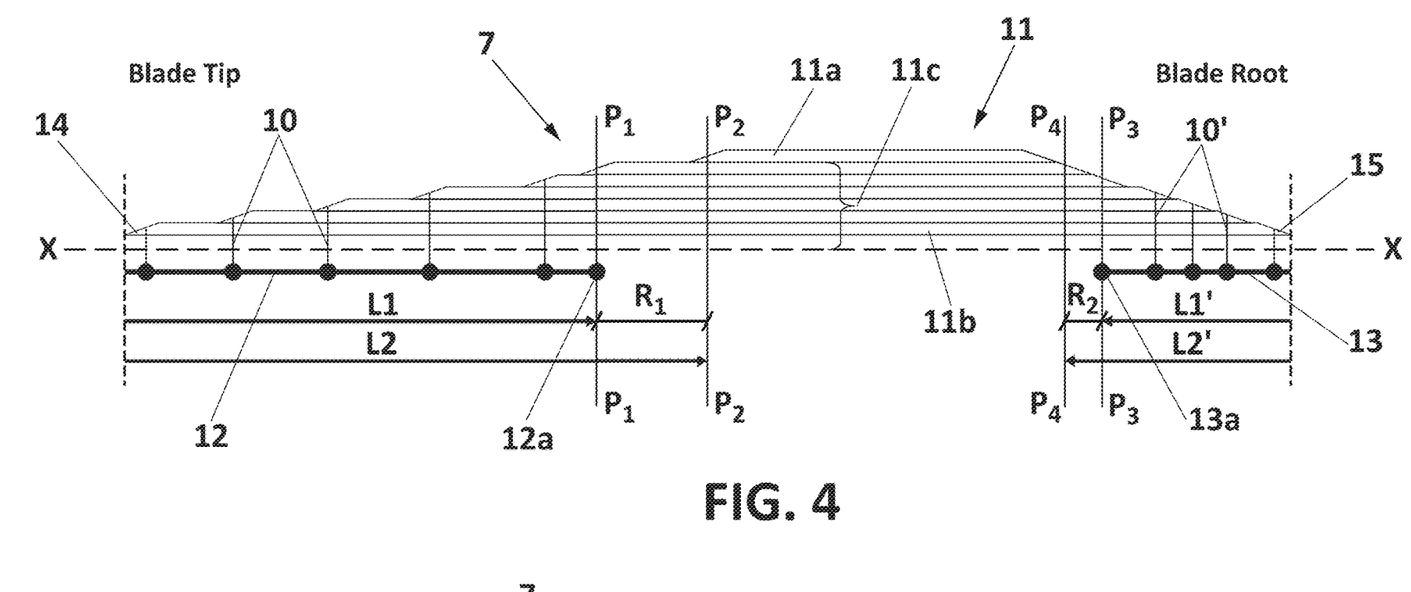
FIG. 4 shows a schematic representation of a longitudinal cross-sectional view of a spar cap of a wind turbine blade according to embodiments of the invention.

FIG. 4 shows an embodiment of the invention, in particular a spar cap (7) of a wind turbine blade, wherein the spar cap (7) conventionally extends from a spar cap's root end (15) to a spar cap's tip end (14), and it is formed by a plurality of carbon plates stacked together, each carbon plate having a tapered root end and a tapered tip end.

The stack (11) of carbon plates has a top plate (11a), a bottom plate (11b) and a plurality of intermediate plates (11c) stacked in between the top and bottom plates (11a, 11b).

The spar cap (7) is an elongated body that extends along an axis (X), wherein conventionally a blade tip region, a blade root region and a blade mid region in between the blade tip and root regions, are defined.

In an embodiment, the wind turbine blade comprises a first down-conductor (12) placed alongside the tip region of the spar cap, and a first set of electric conductors (10) connecting the first down-conductor (12) to some of the tip ends of the carbon plates (11a, 11b,11c), and a second down-conductor (13) placed alongside the root region of the spar cap, and a second set of electric conductors (10') connecting the second down-conductor (13) to some of the roots ends of the carbon plates (11a, 11b,11c).

As represented in FIG. 4, the first down-conductor (12) extends from the tip end (14) of the spar cap (7) towards the spar cap's mid region, and it has a length which is longer or equal than a length (L1) and which is equal or shorter than a length (L2). The length (L1) starts at the tip end (14) of the spar cap and terminates at a spar cap position or radius where the cross-sectional area in that radius of the spar cap (7) is equal or larger than 75% of the maximum cross-sectional area of the spar cap (7). The length (L2) also starts at the tip end (14) and terminates at a spar cap position or radius where the cross-sectional area is 100% of the maximum cross-sectional area of the spar cap (7) and which is closer to the blade's tip end (14).

In an embodiment, the second down-conductor (13) extends from the root end (15) of the spar cap towards the spar cap's mid region, and it has as length equal or longer than (L1') and equal or shorter than a length (L2'). The length (L1') starts at the root end (15) and terminates at a carbon spar cap position or radius where the cross-sectional area in that radius of the spar cap is equal or larger than 75% of the maximum cross-sectional area of the spar cap (7). The length (L2') also starts at the root end (15) and terminates at the carbon spar cap position or radius, where the cross-sectional area is 100% of the maximum cross-sectional area of the spar cap, and which is closer to the root end (15).

The first and second down-conductors (12,13) are made of cooper having a 50 mm$^2$ cross-sectional area. With the above-described range of length of the first and second down-conductor (12,13), the electrical impedance of a region of the spar cap for which no down-conductor is provided, must be lower than the impedance of a 50 mm$^2$ copper conductor, which is the impedance of the first and second down-conductors (12,13).

The first and second down-conductors (12,13) are straight conductors that are arranged parallel to the axis (X), and are electrically connected respectively to all or some of the tip ends of the carbon plates (11a,11b, 11c) by the first set of conductors (10), and to all or some of the root ends of the carbon plates (11a,11b,11c) by the second set of conductors (10').

In an embodiment in view of FIG. 4, is that first down-conductor (12) extends from the spar cap's tip end (14) towards the spar cap's mid region, and terminates at a first down-conductor's end (12a) located adjacent or within a first region (R1) of the spar cap (7). This first region (R1) is a region of the spar cap that extends between a first plane (P1) and a second plane (P2), wherein the first plane (P1) is a plane orthogonal to the axis (X) at which the cross-sectional area of the spar cap (7) at this first plane (P1) is equal or higher than 75% of the maximum cross-sectional area of the spar cap and which is the one closest to the spar cap's tip end (14). The second plane (P2) is a plane orthogonal to the axis (X), and at which the cross-sectional area of the spar cap at this second plane (P2) is 100% of the cross-sectional area of the spar cap, and which area is closest to the spar cap's tip end (14).

Similarly, the second down-conductor (13) extends from the spar cap's root end (15) towards the spar cap's mid region and terminates at a second down-conductor's end (13a) located adjacent or within a second region (R2) of the spar cap (7). This second region (R2) is a region of the spar cap that extends between a third plane (P3) and a fourth plane (P4), wherein the third plane (P3) is orthogonal to the axis (X) at which the cross-sectional area of the spar cap (7) at this third plane (P3) is equal or higher than 75% of the maximum cross-sectional area of the spar cap and which is the one closest to the spar cap's root end (15). The fourth plane (P4) is a plane orthogonal to the axis (X), and at which the cross-sectional area of the par cap at this fourth plane (P4) is 100% of the cross-sectional area of the spar cap and which is the one closest to the spar cap's root end (15).

Figure 5:
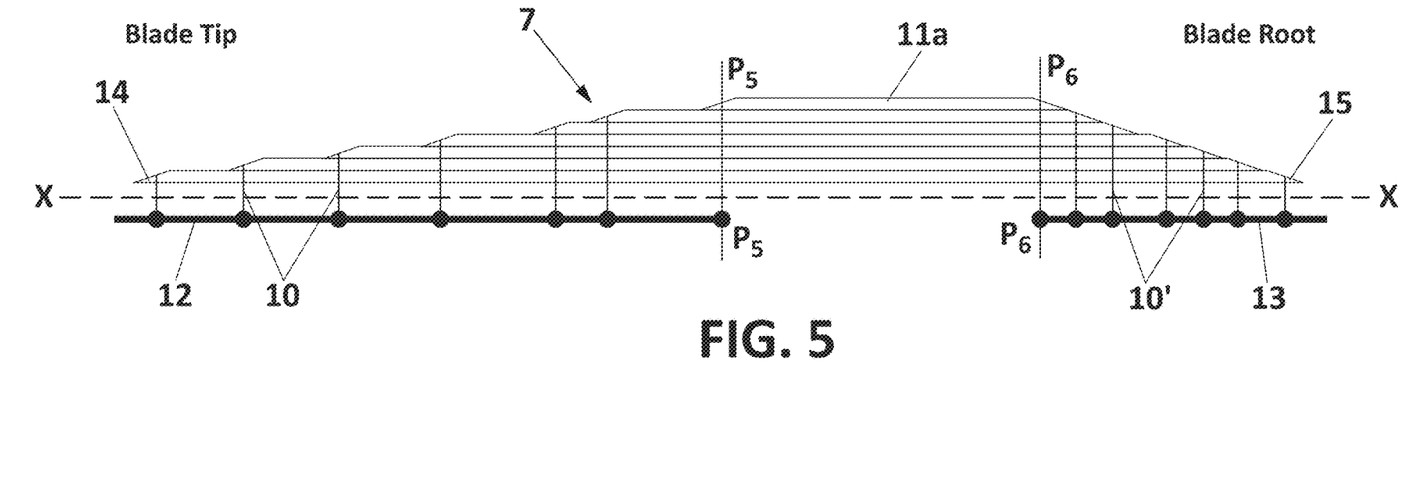
FIG. 5 shows a schematic representation of a longitudinal cross-sectional view of a spar cap of a wind turbine blade according to embodiments of the invention.

In an embodiment shown in FIG. 5, the first down-conductor (12) extends from the spar cap's tip end (14) to a plane (P5) orthogonal to the spar cap's axis (X), which passes through the end of the top carbon plate (11a) which is closest to the spar cap's tip end (14).

In an embodiment, the second down-conductor (13) extends from the spar cap's root end (15) to a plane (P6) orthogonal to the spar cap's axis (X), which passes through the end of the top carbon plate (11a) which is closest to the spar cap's root end (15).

In the embodiment of FIG. 5, all the carbon plates (11a,11b,11c) have their tip end connected to the first down-conductor (12), and their root end connected to the second down conductor (13), respectively by first and second sets (10,10') of electric conductors.

There is no down conductor at a mid-region of the spar cap (7) between planes (P5, P6).

Figure 6:
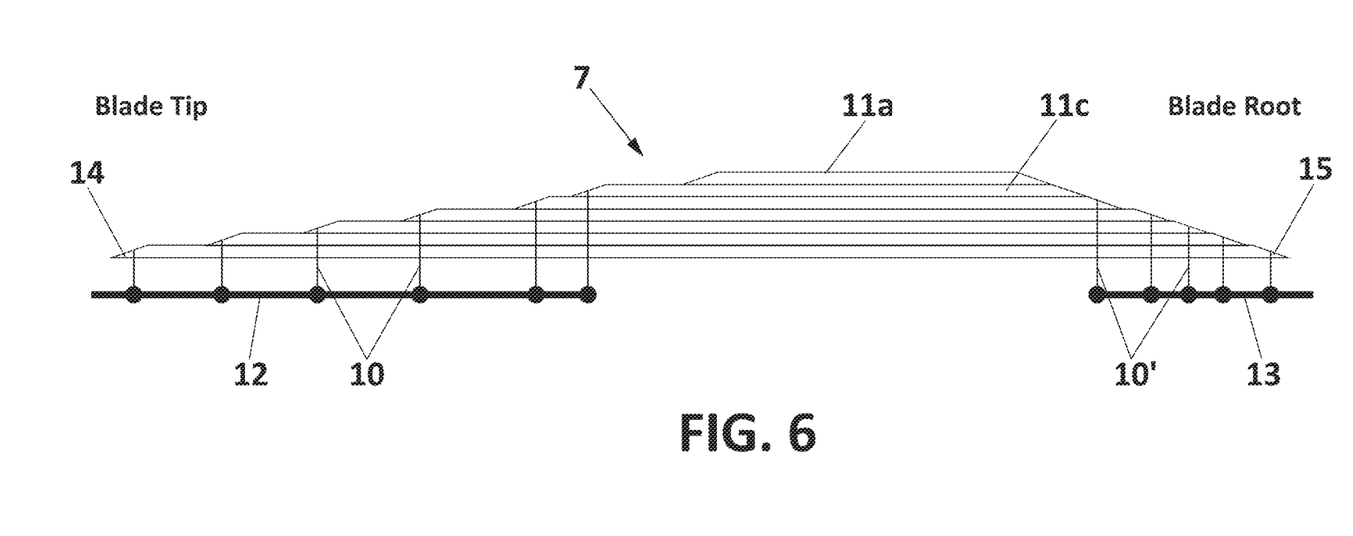
FIG. 6 shows a schematic representation of a longitudinal cross-sectional view of a spar cap of a wind turbine blade according to embodiments of the invention.

In the alternative embodiment of FIG. 6, at least the top carbon plate (11a), and optionally one or more of the intermediate plates (11c), are not connected by a conductor to the first or to the second down-conductors (12,13). In this embodiment, the length of the first and the second down-conductors (12,13), comply with the definition given above in relation to FIG. 4.

Figure 8:
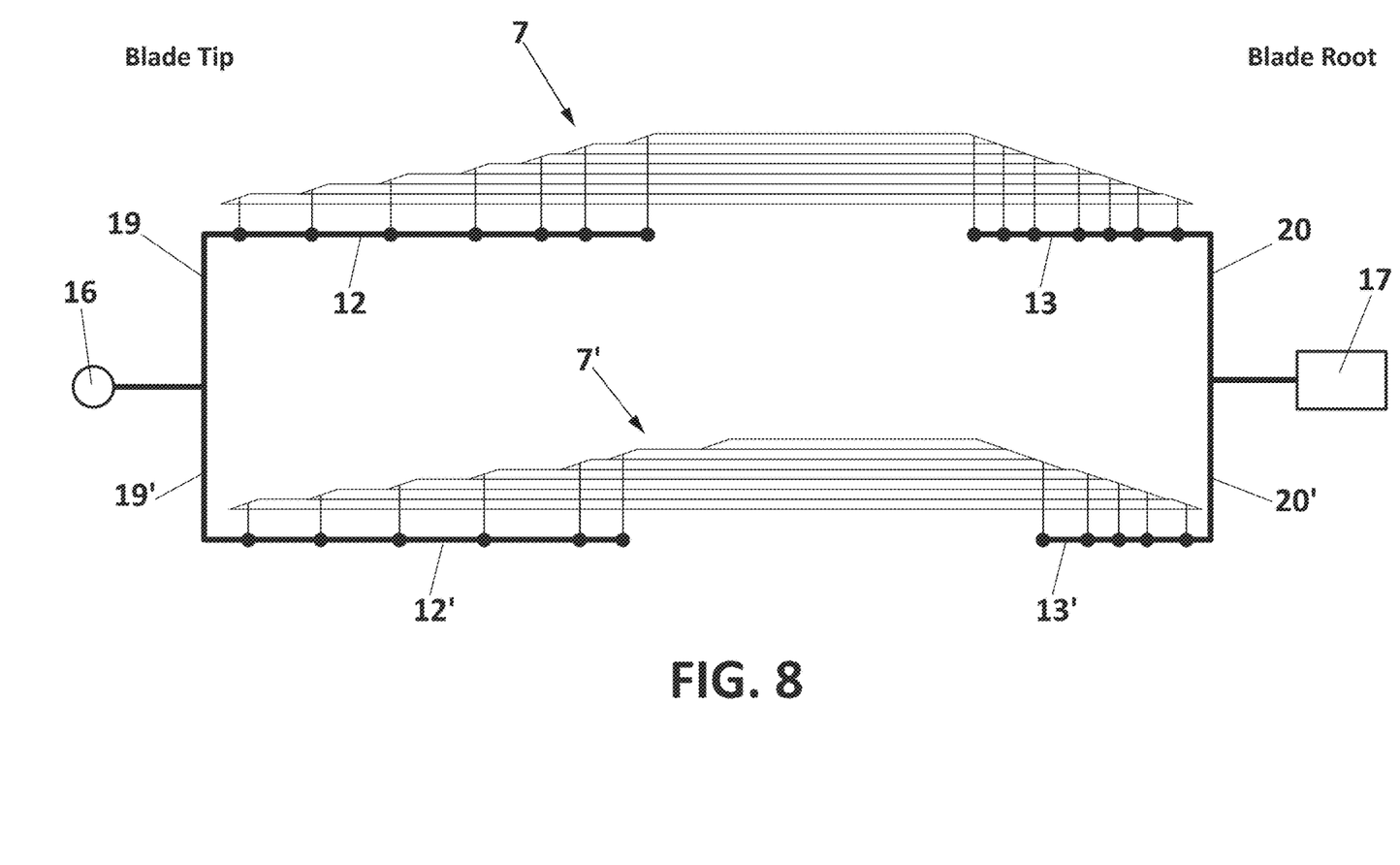
FIG. 8 shows in a schematic representation, an embodiment of the invention including the whole beam having two spar caps, and the complete Lightning Protection System of the embodiments of the invention.

FIG. 8 shows an embodiment of the invention applied to a full blade, that is, having one carbon beam comprising a pressure spar cap and a suction spar cap. In this particular embodiment comprising two spar caps, namely a first spar cap (7) and a second spar cap (7'), each spar cap constructed as shown in any of the FIGS. 4, 5 and 6 and as described above in relation to any of those figures or any combination thereof. In the particular embodiment of FIG. 8, the first spar cap (7) is constructed as shown in FIG. 5 and as described above in relation to FIG. 5, and the second spar cap (7') is constructed as shown in FIG. 6 and as described above in relation to FIG. 6.

The embodiment of FIG. 8 includes a lightning receptor (16) installed nearby the blade tip from the beam tip end, and a root terminal (17) installed nearby the blade root from the beam root end. The two down-conductors (12,12') of the tip region of the spar caps (7,7') are connected at one end to the lightning receptor (16) by additional metallic conductors (19,19'), and the two down-conductors (13,13') of the root region of the spar caps (7,7') are connected at one end to the root terminal (17) by additional metallic conductors (20,20'), as shown in FIG. 8. A lightning strike would penetrate through the lightning receptor (16), and would circulate through the down-conductors, mid region of the spar caps (7,7'), and through the root terminal (17).

Figure 7:
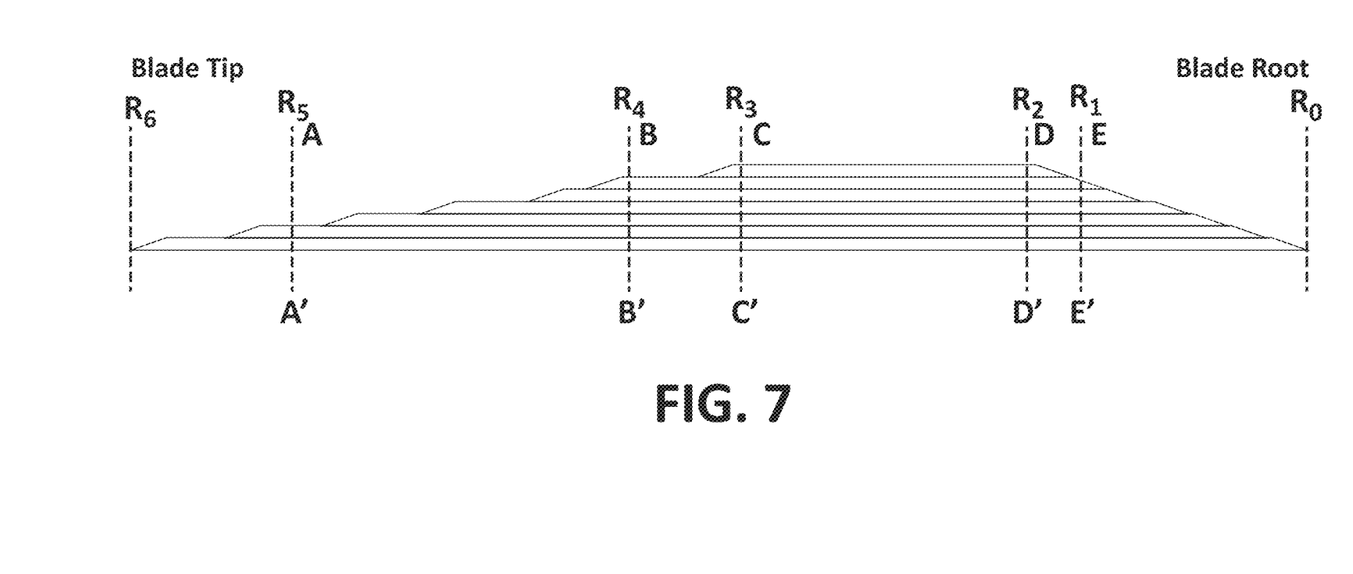
FIG. 7 shows a schematic representation of a longitudinal cross-sectional view of a spar cap of a wind turbine blade according to embodiments of the invention.

FIG. 7, in combination with Tables 1 and 2 below, provide some figures on the dimensions in which the cross-sectional area of the spar cap reaches ≥75%, and 100% from the tip and from the root, as defined above.

TABLE 1

| Radius: | Cross-section respect maximum carbon spar cap cross-section [%] |
|---|---|
| R0 & R6 | 0% |
| R1 | 85% |
| R2 | 100% |
| R3 | 100% |
| R4 | 85% |
| R5 | 28.5% |

TABLE 2

| Radius: | Length [m] | Percentage of the carbon spar cap length [%] |
|---|---|---|
| R0-R1 | 3-10 | 5-10% |
| R0-R2 | 10-15 | 10-15% |
| R2-R3 | 30-60 | 50-60% |
| R6-R5 | 2-6 | 3-7% |
| R6-R4 | 15-30 | 25-35% |
| R6-R3 | 20-40 | 35-50% |

As an example, and in order to describe the effect of parallel impedances using different materials and cross-sections, it may be supposed that a metallic main down-conductor has a cross-section of 50 mm$^2$, and the carbon plates as described above, specially at tip region have a total cross-section of about 1000 mm$^2$ multiplied by the number of carbon plates. As the resistivities of both materials are approximately: Cu: 1.66E-08 Ohm·m, and Carbon: 2.30E-05 Ohm·m, it leads to a resistance (R) per meter in each case for a 50 mm$^2$ Copper cable and 1000 mm$^2$ carbon plate of about:

| R Cu | 0.000333 Ohm/m |
|---|---|
| R Carbon | 0.02300 Ohm/m |

This means that 69 carbon plates in parallel are needed to get the same voltage drop per meter or the same resistance per meter, than for a copper conductor. The explanation above applies to low frequencies. In high frequencies this ratio is reduced because of skin effect affecting more the metallic conductor because its geometry (smaller cross-section). For first positive short stroke at 25 kHz, this ratio is reduced at around 15, meaning that a cross-section of 15 carbon plates would have same resistance per meter of a 50 mm$^2$ copper cable. In an embodiment of the invention, 15 carbon plates are accumulated far from the tip region, so, a down-conductor is needed a certain length from the start of the carbon spar cap at the tip, whereas at the root the increase on number of carbon plates is faster (larger spar cap slope).

In wind turbine blades a copper lightning conductor is always used as main down-conductor. A 50 mm$^2$ cable is commonly used in all blades, either fiberglass or carbon blades. The impedance is an electrical parameter which depends on the frequency. Basically, in lightning frequencies (up to 1 MHZ) the impedance is mainly affected by the contribution of the resistance and the self-inductance of the conductors.

Figure 9:
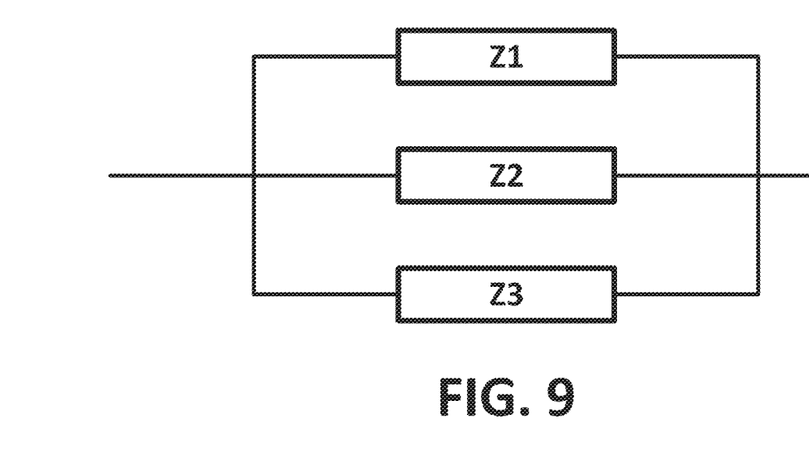
FIG. 9 shows an electric diagram representing the electric impedances involved in the electric circuit integrated in a blade according to embodiments of the invention.

As shown in FIG. 9, in a carbon blade with two carbon spar cap, there are in general three impedances in parallel; one of the metallic cable and two of the carbon spar caps (pressure and suction caps), wherein Z1 and Z3 are the impedances of the carbon spar caps, and Z2 is the impedance of the metallic cable which is used as main down-conductor.

These three impedances Z1, Z2 and Z3 may be split into multiple impedances because Z1 and Z3 are not constant along the spar cap axis (X) whereas Z2 is constant (cable cross-section is constant). Therefore, in a general case, the three branches of the circuit of FIG. 9 can be discretized as shown in FIG. 10.

Figure 10:
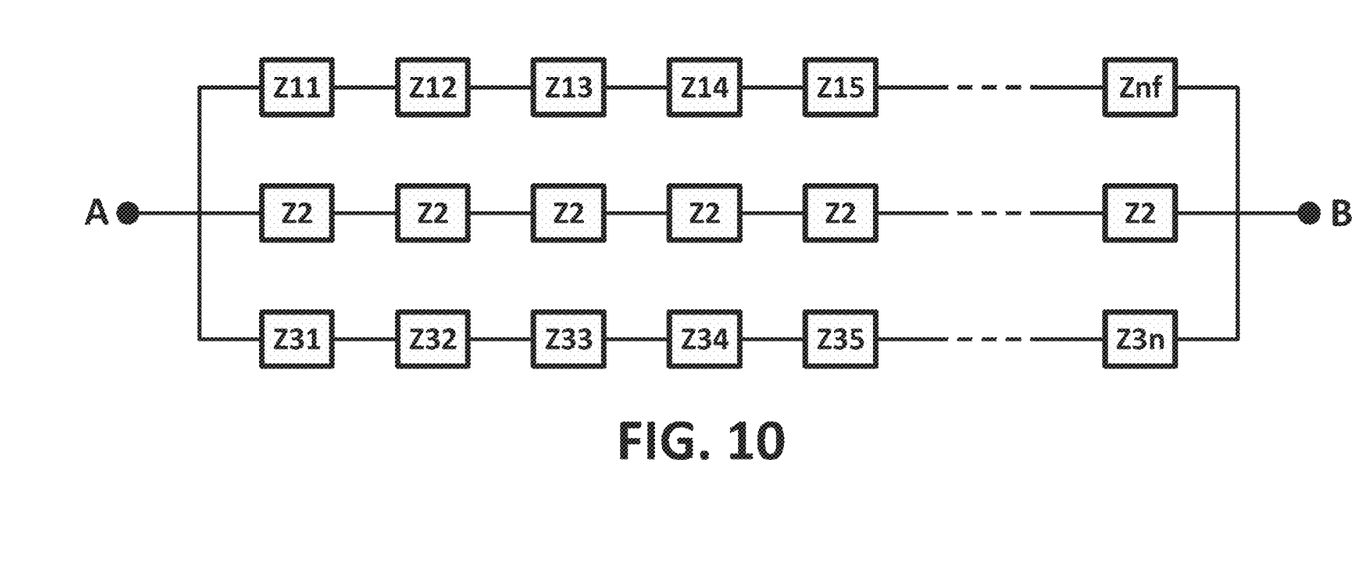
FIG. 10 shows an electric diagram representing the electric impedances involved in the electric circuit integrated in a blade according to embodiments of the invention.

In FIG. 10, Z2 is a constant impedance [Ω/m], while the different longitudinal segments of impedances Z1 and Z3 change along the blade. Therefore, in general for standard carbon blades, it leads to the condition shown in FIG. 11 of the impedance for a reference frequency of 25 kHz.

Figure 11:
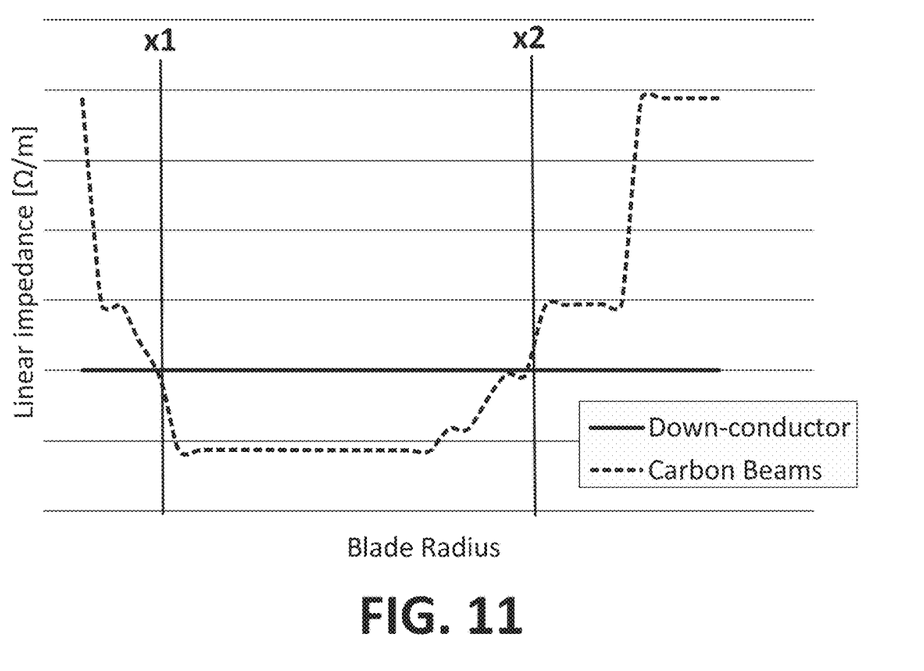
FIG. 11 shows a graph representing the linear impedance of the carbon beam material, against blade radius of a beam according to embodiments of the invention. The blade radius is the distance from the rotating point about which the blade rotates, to a particular point in the blade.

In the graph of FIG. 11, at blade mid-span regions, as soon as the cross-section of the blade spar caps is increased, the linear impedance of the carbon beam is lower than the one of the down-conductor, which means that most of the lightning current flows through the carbon beam, and the down-conductor may be removed at the mid-span region, in particular at a region between X1 and X2.

Figure 12:
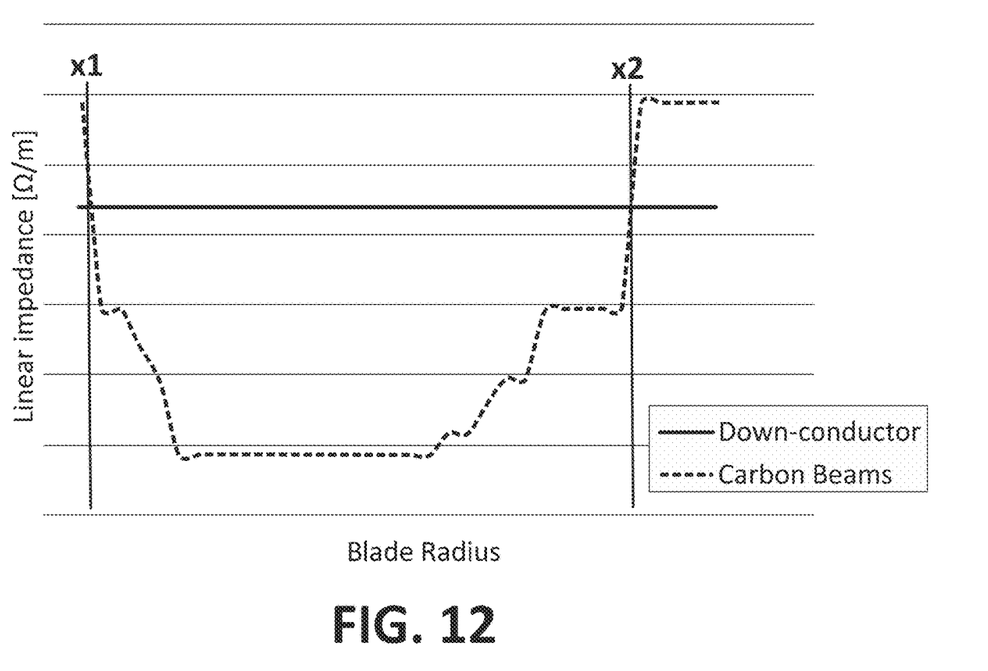
FIG. 12 shows a graph representing the linear impedance of the carbon beam material, against blade radius of a beam according to embodiments of the invention. The blade radius is the distance from the rotating point about which the blade rotates, to a particular point in the blade.

The scenario for frequencies higher than 25 kHz is shown in FIG. 12.

The graphs of FIGS. 11 and 12 demonstrate that even as a single conductor carbon fibers are worst conductors of electrical currents than copper conductors, when having much higher cross-sectional area, and taking into account the reduced self-inductance of the spar caps respect to copper cables used in blades, the total linear impedance of the spar caps is lower than the one for the copper cables. It should be emphasized that this is feasible due to the high frequency nature of lightning strikes, and that low frequency lightning events are not compromising the circuit as the values of lightning currents at low frequencies, are much lower than at 25 kHz (values of 2 kA are maximum for low frequencies, which produce a lower voltage drop and Joule heating lower than the maximum 200 kA with 10 MJ/Ω at 25 kHz).

It has been described above that the linear impedance of the carbon spar cap is lower in mid-span regions, so it happens physically when the cross-section of each spar cap is higher than 75% of its maximum cross-section. In this scenario, it may be defined that the metallic cable to inject the lightning current into the carbon spar cap may have a length ≥L1 and ≤L2 being L1 the length in which the carbon spar cap has a cross-section of ≥75% of the maximum spar cap cross-section and L1 a value of 100%, or have a length ≥L1' and ≤L2' being L1' the length in which the carbon spar cap has a cross-section of ≥75% of the maximum spar cap cross-section and L1' a value of 100%, as defined above in relation to FIG. 4.

The embodiment of FIG. 4 includes only one main spar cap (7) which may comprise several parallel stacks or just a single stack of carbon plates. However, other embodiments may include a second parallel carbon spar cap with different length and starting and ending radius than the main spar cap. This is for example when using a rear cap, in some blades, in which a shorter cap is needed for structural reasons at the trailing edge of the blade's shell.

Figure 13:
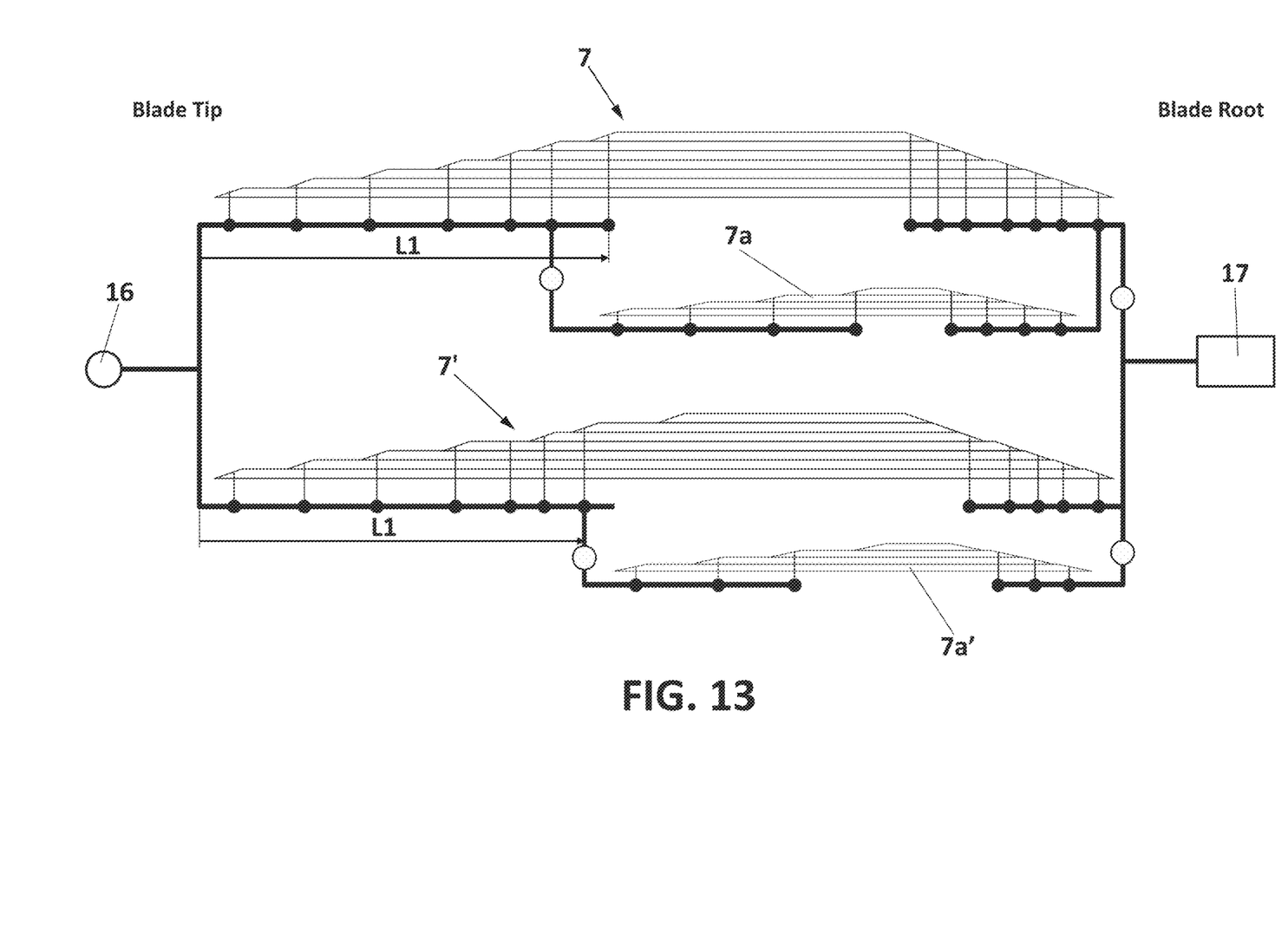
FIG. 13 shows an exemplary embodiment of the invention including four spar caps.

FIG. 13 shows an embodiment having two main spar caps (7,7') and two secondary spar caps (7a,7a') shorter than the main spar caps and parallel to them. In this embodiment, the distance between the tip end of a secondary beam (7a,7a') to the tip end of the main beam (7,7') is equal or longer than the distance (L1) defined above in relation with FIG. 4.

Figure 14:
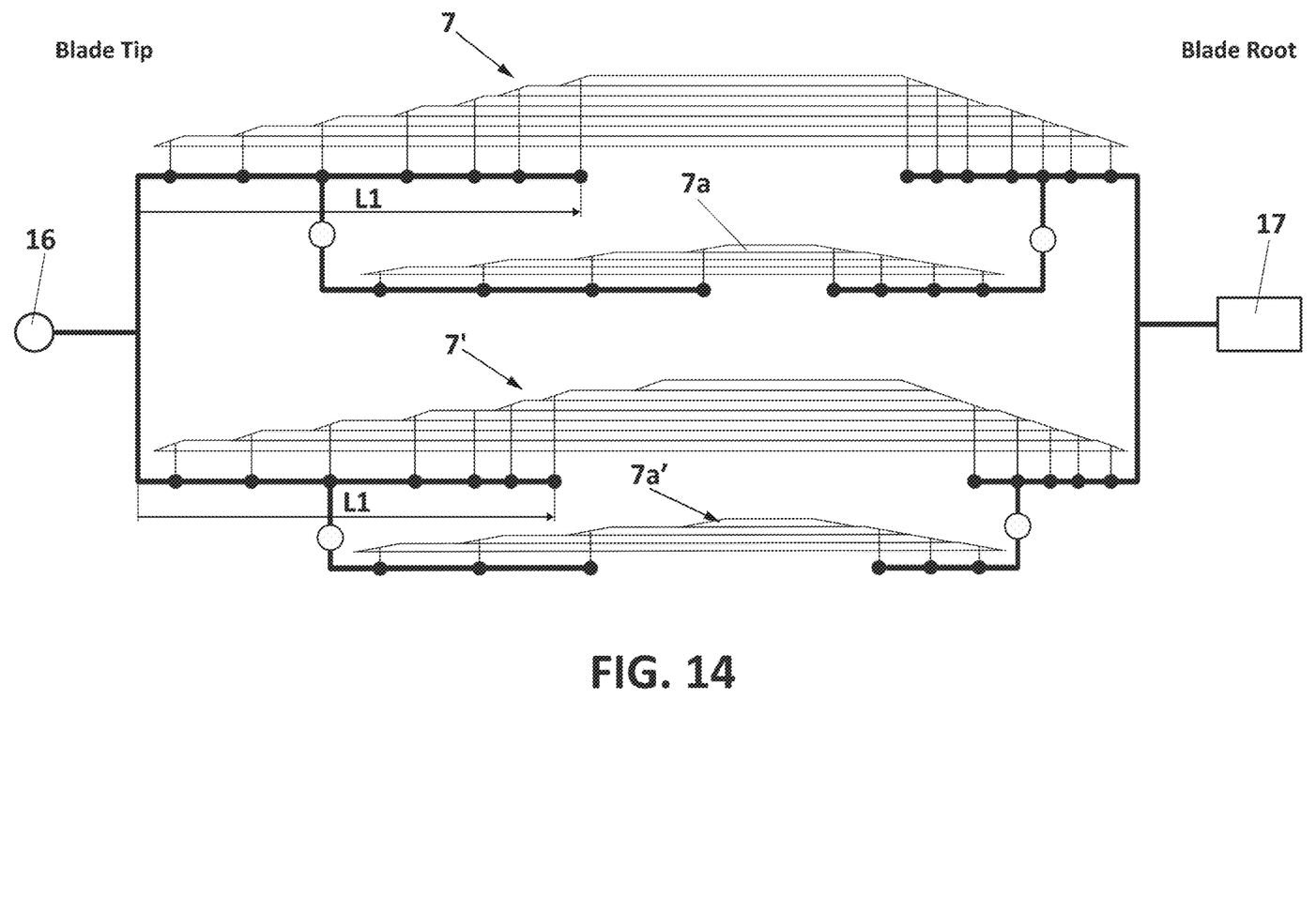
FIG. 14 shows an exemplary embodiment of the invention including four spar caps.

FIG. 14 shows another embodiment also having two main spar caps (7,7') and two secondary spar caps (7a,7a') shorter than the main spar caps and parallel to them. In this embodiment, the distance between the root end of the secondary beams (7a,7a') to the root end of the main beam (7,7') is shorter than the distance (L1) defined above in relation with FIG. 4.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade integrating a lightning protection system,
the wind turbine blade including at least one conductive spar cap formed by a stack of carbon plates having a plurality of carbon plates stacked together between a top carbon plate and a bottom carbon plate, and wherein each carbon plate has a root end and a tip end, and
wherein the spar cap is an elongated body extending along an axis from a spar cap's root end to a spar cap's tip end, and having a blade tip region, a blade root region and a blade mid region in between the blade tip and root regions,
wherein,
the wind turbine blade further comprises a first down-conductor placed alongside the tip region of the spar cap, and a plurality of electric conductors connecting the first down-conductor to some of the tip ends of the carbon plates, and a second down-conductor placed alongside the root region of the spar cap, and a plurality of electric conductors connecting the second down-conductor to some of the root ends of the carbon plates, and wherein the first down-conductor extends from the spar cap's tip end towards the spar cap's mid region, and terminates at a first down-conductor's end located adjacent a first region of the spar cap which extends from a cross-sectional area of the spar cap which area is equal or higher than 75% of the maximum cross-sectional area of the spar cap, being that area the one closest to the spar cap's tip end, to a cross-sectional area of the spar cap which area is 100% of the cross-sectional area of the spar cap, being that 100% of the cross-sectional area the one closest to the spar cap's tip end.

2. The wind turbine blade according to claim 1, wherein the second down-conductor extends from the spar cap's root end towards the spar cap's mid region, and terminates at a second down-conductor's end located adjacent a second region of the spar cap which extends from a cross-sectional area of the spar cap which area is equal or higher than 75% of the maximum cross-sectional area of the spar cap, being that area the one closest to the spar cap's root end, to a cross-sectional area of the spar cap which area is 100% of the cross-sectional area of the spar cap, being that 100% of the cross-sectional area the one closest to the spar cap's root end.

3. The wind turbine blade according to claim 1, wherein at least the top carbon plate of the stack of carbon plates, is not electrically connected by an electric conductor to the first or to the second down conductors.

4. The wind turbine blade according to claim 1, wherein the first down-conductor extends from the spar cap's tip end to a plane orthogonal to the spar cap which passes through the end of the top carbon plate which is closest to the spar cap's tip end, and wherein there is an electric conductor connecting the top carbon plate's tip end to the first down-conductor.

5. The wind turbine blade according to claim 4, wherein the second down-conductor extends from the spar cap's root end to a plane orthogonal to the spar cap which passes through the end of the top carbon plate which is closest to the spar cap's root end, and wherein there is an electric conductor connecting the top carbon plate's root end to the second down-conductor.

6. The wind turbine blade according to claim 4, wherein all the carbon plates of the stack of carbon plates, have their tip end connected to the first down-conductor and their root end connected to the second down conductor.

7. The wind turbine blade according to claim 1, wherein the spar cap is an elongated body extending along an axis X, and wherein the first and the second down-conductors, are generally straight conductors running parallel to the axis X.

8. The wind turbine blade comprising two spar caps, namely a first spar cap and a second spar cap, each one constructed as defined in claim 1, the blade further comprising a lightning receptor at the tip of the beam, and a root terminal at the root end, and wherein the down-conductors of the tip region of the spar caps are connected at one end to the lightning receptor, and the down-conductors of the root region of the spar caps are connected at one end to the root terminal.

9. The wind turbine blade comprising two main spar caps and two secondary spar caps, each one of the spar caps constructed as defined in claim 1, and wherein the secondary spar caps are shorter than the main spar caps and extend parallel to the main spar caps, and wherein the distance between the tip end of a secondary spar caps to the tip of the a main spar caps is equal or longer than a length, wherein the length starts at the tip end of the main spar cap and terminates at a main spar cap position or radius where the cross-sectional area in that radius of the spar cap is equal or larger than 75% of the maximum cross-sectional area of the spar cap.

10. The wind turbine blade comprising two main spar caps and two secondary spar caps, each one of the spar caps constructed as defined in claim 1, and wherein the secondary spar caps are shorter than the main spar caps and extend parallel to the main spar caps, and wherein the distance between the tip end of a secondary spar caps to the tip end of the main spar caps is shorter than the a length, wherein the length starts at the tip end of the main spar cap and terminates at a main spar cap position or radius where the cross-sectional area in that radius of the spar cap is equal or larger than 75% of the maximum cross-sectional area of the spar cap.

11. The wind turbine blade according to claim 1, wherein the first and the second down-conductors) are made of copper, aluminum, or other conductive material.

12. The wind turbine blade according to claim 11, wherein the cross-sectional area of the first and the second down-conductors is between 25 $mm^2$ and 50 $mm^2$.

* * * * *